United States Patent
Patton

(10) Patent No.: US 7,209,245 B2
(45) Date of Patent: Apr. 24, 2007

(54) PRINTING SYSTEMS, SOFTWARES, AND METHODS FOR USER CHARACTERIZATION OF UNKNOWN PRINTER MEDIA

(75) Inventor: Ronnie Neil Patton, Lake Oswego, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 908 days.

(21) Appl. No.: 09/957,394

(22) Filed: Sep. 20, 2001

(65) Prior Publication Data

US 2003/0053103 A1 Mar. 20, 2003

(51) Int. Cl.
*B41B 1/00* (2006.01)
*G06F 15/00* (2006.01)

(52) U.S. Cl. .................. 358/1.13; 358/1.9
(58) Field of Classification Search .......... 358/1.15, 358/1.2, 1.9, 3.23, 1.13, 1.14, 504, 406
See application file for complete search history.

(56) References Cited

U.S. PATENT DOCUMENTS

| | | | |
|---|---|---|---|
| 5,333,069 A * | 7/1994 | Spence | 358/517 |
| 5,452,112 A | 9/1995 | Wan et al. | |
| 5,612,902 A | 3/1997 | Stokes | |
| 5,650,942 A | 7/1997 | Granger | |
| 5,760,913 A | 6/1998 | Falk | |
| 5,895,836 A | 4/1999 | Uzik | |
| 5,923,446 A | 7/1999 | Nakagiri | |
| 5,984,193 A | 11/1999 | Uhling | |
| 5,995,714 A | 11/1999 | Handley | |
| 6,008,907 A | 12/1999 | Vigneau | |
| 6,047,110 A | 4/2000 | Smith | |
| 6,072,589 A | 6/2000 | Rozzi | |
| 6,079,807 A | 6/2000 | Lindstrom | |
| 6,088,038 A | 7/2000 | Edge | |
| 6,108,442 A | 8/2000 | Edge et al. | |

(Continued)

FOREIGN PATENT DOCUMENTS

JP 06-350838 12/1994

OTHER PUBLICATIONS

English language abstract of Japan Patent No. JP06-350838.

*Primary Examiner*—Twyler Lamb
*Assistant Examiner*—Benjamin Dulaney
(74) *Attorney, Agent, or Firm*—Marger Johnson & McCollom, PC

(57) ABSTRACT

Printing systems, softwares and methods permit an untrained user to characterize unknown printing media. A printing system includes a printing device that prints on a medium according to settings. The printing system also includes an interface, and a controller for controlling the settings responsive to inputs from the interface. The controller has an on line mode for printing while the settings are unchanging, and an off line mode for calibration of the settings. While in the off line mode, the controller is adapted to identify a plurality of calibration values for the setting. The controller is further adapted to control the printing device to iteratively set the setting of the printing device according to one of the first calibration values and then print a sample image. This may take place for all the calibration values. Having the sample images, the user selects the best one, and enters its a characteristic number. That number is interpreted to derive the preferred calibration value for the setting. The user may repeat the procedure for each of the various settings.

22 Claims, 4 Drawing Sheets

U.S. PATENT DOCUMENTS

| | | |
|---|---|---|
| 6,141,120 A | 10/2000 | Falk |
| 6,215,562 B1 * | 4/2001 | Michel et al. ............... 358/1.9 |
| 6,262,810 B1 * | 7/2001 | Bloomer ..................... 358/1.9 |
| 6,384,895 B1 * | 5/2002 | Sawano ....................... 355/40 |
| 6,606,167 B1 * | 8/2003 | Rees et al. ................... 358/1.9 |
| 6,788,431 B1 * | 9/2004 | Yamaguchi ................. 358/1.9 |
| 6,840,597 B1 * | 1/2005 | Wilson et al. ................ 347/19 |
| 2002/0054769 A1 * | 5/2002 | Nakamura ................... 399/15 |
| 2003/0164960 A1 * | 9/2003 | Housel ....................... 358/1.9 |

* cited by examiner

PRINTING SYSTEMS, SOFTWARES, AND METHODS FOR USER CHARACTERIZATION OF UNKNOWN PRINTER MEDIA

BACKGROUND OF THE INVENTION

1. Field of the Invention

The present invention is related to the field of printing systems, such as printers and copiers associated with computer systems and networks, and more specifically to printing systems, softwares and methods for user characterization of unknown media.

2. Description of the Related Art

Most printer and copier manufacturers provide or recommend specific output media for use with their products. Such printing media include various paper types, transparencies for overhead projectors, fabric transfer, etc. Most such manufacturers even sell such media under their own brand.

A number of manufacturers perform tests to determine the suitability of other media. In most instances they publish specification data for acceptable media. The specification data includes permissible media thicknesses, weights, sizes, etc.

New media present a problem, especially with color. Before a printing system is sold, the problem is addressed by imaging professionals, who have tools and procedures for characterizing the new media. The tools include measuring devices (spectrophotometers, densitometers) and color software. A trained professional will spend a lot of time measuring the basic color (white point) of the media, surface reflectance, thermal characteristics and overall appearance. The measurements are applied, using software, to determine proper settings for the printer or copier to ensure the best possible image of the new image.

After a printing system is sold, however, there is no opportunity for such adjusting of settings for characterizing new media. For example, copiers and printers are purchased and installed in general business offices. New media may be encountered, that are unknown (in other words, not characterized). Such new media may include letterhead bond paper for the business, which has custom color and/or custom construction.

In such cases, unexpected undesirable results often occur. The colors may shift. The image density may be greater or less than expected. Toner based products might not fuse correctly to the media. In addition, businesses may change their standard letterhead bond paper from time to time. These problems are not easily addressed, because general business offices lack trained imaging professionals.

BRIEF SUMMARY OF THE INVENTION

The present invention overcomes these problems and limitations of the prior art.

Generally, the present invention provides printing systems, softwares and methods for user characterization of unknown media. The new media is characterized by the user in the field, even though they might not be trained in the color imaging arts.

A printing system according to the invention includes a printing device. The printing device is for printing on a printing medium in accordance with settings. The printing system also includes an interface. The printing system additionally includes a controller for controlling the settings responsive to inputs from the interface. The controller has an on line mode for printing while the settings are unchanging, and an off line mode for calibration of the settings.

While in the off line mode, the controller is adapted to identify a plurality of calibration values for the setting. This takes place in a number of ways, according to the invention. The controller is further adapted to control the printing device to iteratively set the setting of the printing device according to one of the first calibration values and then print a sample image. This may take place for all the calibration values.

At that time, the user visually inspects the sample images, and selects the best one. Then the user enters a characteristic number for the selected image. The controller is additionally adapted to receive the feedback input that identifies the preferred calibration value.

The user repeats the procedure for each of the various settings. The printing system therefore becomes optimized in the field.

The invention offers the advantage that no special preparation need be made by the manufacturer, in trying to anticipate what exactly medium the user will try to use. Nor does the user need to hire a trained imaging professional.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides printing systems, softwares and methods for user characterization of unknown media. The invention is now described in more detail.

Figure 1:
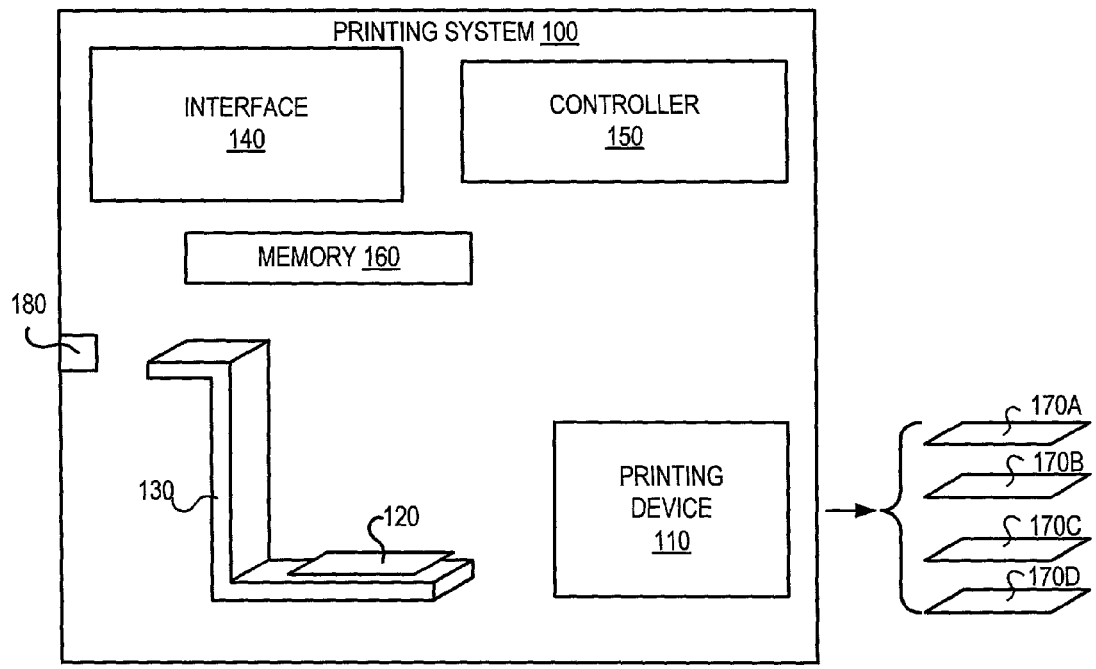
FIG. 1 is a block diagram of a printing system made according to an embodiment of the present invention.

Referring now to FIG. 1, a printing system 100 made according to an embodiment of the invention is shown. System 100 may be a copier or a printer.

Printing system 100 includes a printing device 110. Printing device 110 is for printing in accordance with settings. Device 110 is for printing on a printing medium that is to be characterized, such as sheet 120. Optionally many such sheets 120 are stored on a tray 130 of system 100.

Printing system 100 also includes an interface 140. Interface 140 may be implemented in a number of ways according to the invention, as is described in more detail below with reference to FIG. 2.

Printing system 100 additionally includes a controller 150. Controller 150 receives inputs from interface 140, and accordingly controls the settings of printing device 110.

Printing system 100 optionally additionally includes a memory 160. Memory 160 may be used for storing values and programs of operation for controller 150. Alternately, a memory may be implemented in an associated personal computer.

Controller 150 has an on line mode for printing, during which mode the settings of printing device 110 are unchanging. Controller 150 also has an off line mode according to the invention for calibration of the settings.

While in the off line mode, controller 150 is adapted to identify a plurality of calibration values for each setting that is being calibrated. This takes place in a number of ways, according to the invention.

In a first, simple embodiment, the calibration values are preset for the each setting. In this case, identifying is performed by looking up the related values, once it is determined which setting is to be calibrated. The values may be preset according to a maximum and a minimum, with a number of values in between. A disadvantage of this embodiment is that it might not permit reaching a refined value.

In a second, more advanced embodiment, controller 150 is adapted to receive at least one trigger value regarding the first setting. The trigger value causes the calibration values to be derived. This embodiment is more advanced, as it may require the user to read a manual with actual number values.

The trigger value may be implemented in a number of ways. For example, it may correspond to an initial value, in which case the calibration values may be derived by adding an increment a number of times. The increment may have a preset value, or a value that is entered as part of the trigger value.

Controller 150 is further adapted to control the printing device 110 to perform an iteration. For each of the calibration values, control 150 sets printing device 110 accordingly, and then printing device 110 prints a sample image. A plurality of sample images are then printed. They may be printed on a single sheet, or on a plurality of sheets 170A, 170B, 170C, 170D. This preferably takes place for all the calibration values.

At that time, the user visually inspects the sample images, and selects the best one. Then the user enters a characteristic number for the selected image.

Controller 150 is additionally adapted to receive the feedback input that identifies the preferred calibration value, for the setting that was being tested. Controller 150 may optionally store the calibration value in memory 160.

The user may repeat the procedure for each of the various settings. Printing system 100 therefore becomes optimized in the field for the specific media.

Optionally, printing system 100 includes a bar code scanner 180. Scanner 180 may be used to scan in to memory 160 a barcode containing a code number for the type of paper being used. The barcode may be found on a box containing the media, which identifies the media uniquely. Such scanning might optionally cause system 100 to not recognize media 120, in which case system 100 starts the characterization procedure.

Figure 2:
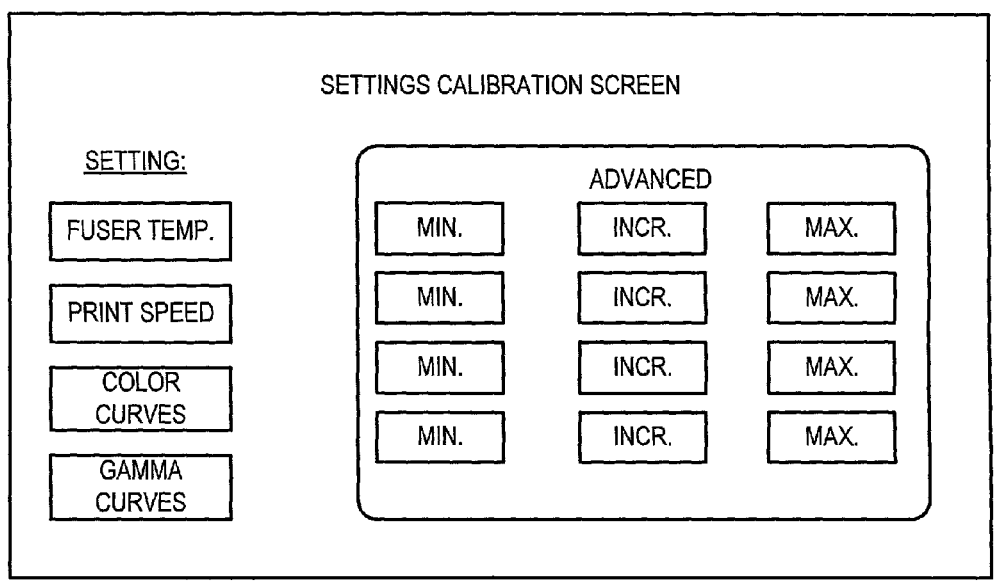
FIG. 2 is a view of an interface of the printing system according to an embodiment of the present invention.

Referring now to FIG. 2, an embodiment of an interface 240 is shown as a screen. Interface 240 may be implemented as a screen on a personal computer. Interface 240 is for receiving inputs from a user, such as the trigger data described above.

Alternately, interface 240 may be implemented as a screen 140 on printing system 100. In that case, interface 140 may be implemented in conjunction with an existing screen of printing system 100. Alternately, interface 140 may simply be terminations of wires, for connection with other wires, through which to receive electronic signals.

Interface 240 preferably includes indications of settings for which calibration is to take place. Such settings include a temperature of a fuser, a print speed, a set of color curves, a set of gamma curves, a set of white point data, etc. Other fields could also be shown, to denote an entered number, etc.

It will be appreciated that the design of interface 240 permits a hybrid approach. Each of the adjustable settings may be selected by clicking with a mouse, or pushing on the screen. This will immediately identify the relevant calibration values, for a coarse calibation. Alternately, the more advanced section might permit the user to select and then enter an initial value (denoted as "MIN."), a maximum value ("MAX.") and an increment ("INCR."). In another embodiment, the increment may be fixed. Instead of a maximum value, a number of samples may be entered, etc. This will permit are refined calibration.

Figure 3:
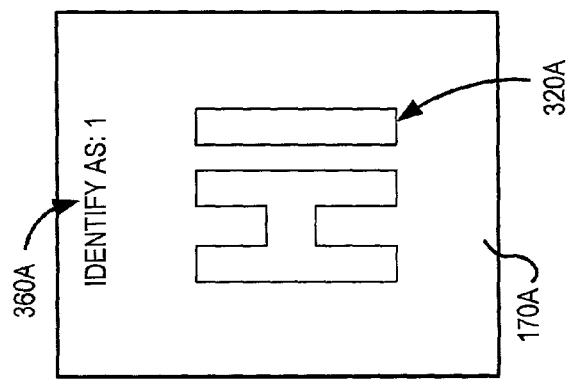
FIG. 3A, FIG. 3B, FIG. 3C, FIG. 3D, are views of successive images produced by the system of FIG. 1 for purposes of calibrating one of the settings.
Figure 3:
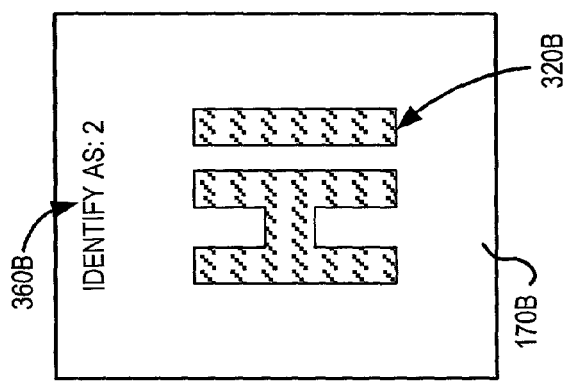
Figure 3:
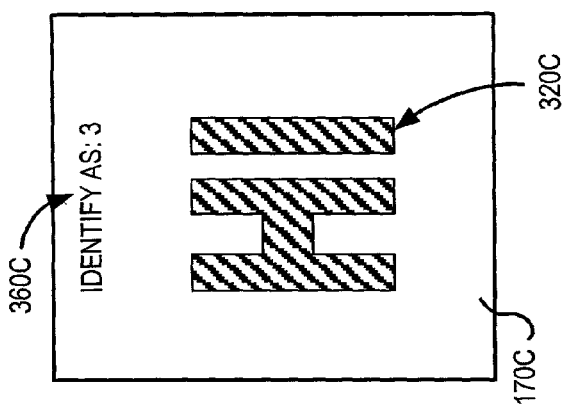
Figure 3:
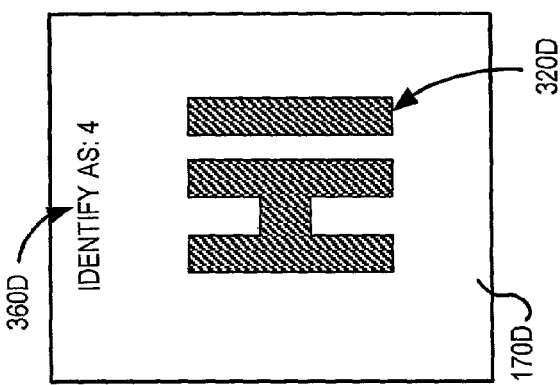

Referring now to FIG. 3, sheets 170A, 170B, 170C, 170D are examined in more detail. They bear respective images 320A, 320B, 320C, 320D, which started from the same image, but were printed using different calibration values for a single setting. In the preferred embodiment, the same original electronic image is used to generate the sample images, but that is not necessary for practicing the invention.

The user selects one of them (in this instance, sheet 170C), the one that looks the best. The user then communicates this choice (which is thus also a choice of a calibration value) to printing system 100. System 100 then knows to calibrate the setting under test of device 110 with the calibration value that produced sheet 170C. That calibration value becomes the preferred calibration value of the setting.

Returning briefly to FIG. 1, in the preferred embodiment controller 150 is further adapted to control printing device 110 to also print an indicium on each sample. In the present description, returning to FIG. 3, indicia 360A, 360B, 360C, 360D appear on the respective sheets 170A, 170B, 170C, 170D.

Each indicium 360A, 360B, 360C, 360D directs the user as to how to identify the calibration value used to produce the sample. For example, to select sheet 170C, the user would enter 3, from indicium 360C. Controller 150 is adapted to interpret the feedback input based on the indicium, to determine the preferred calibration value.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 4:
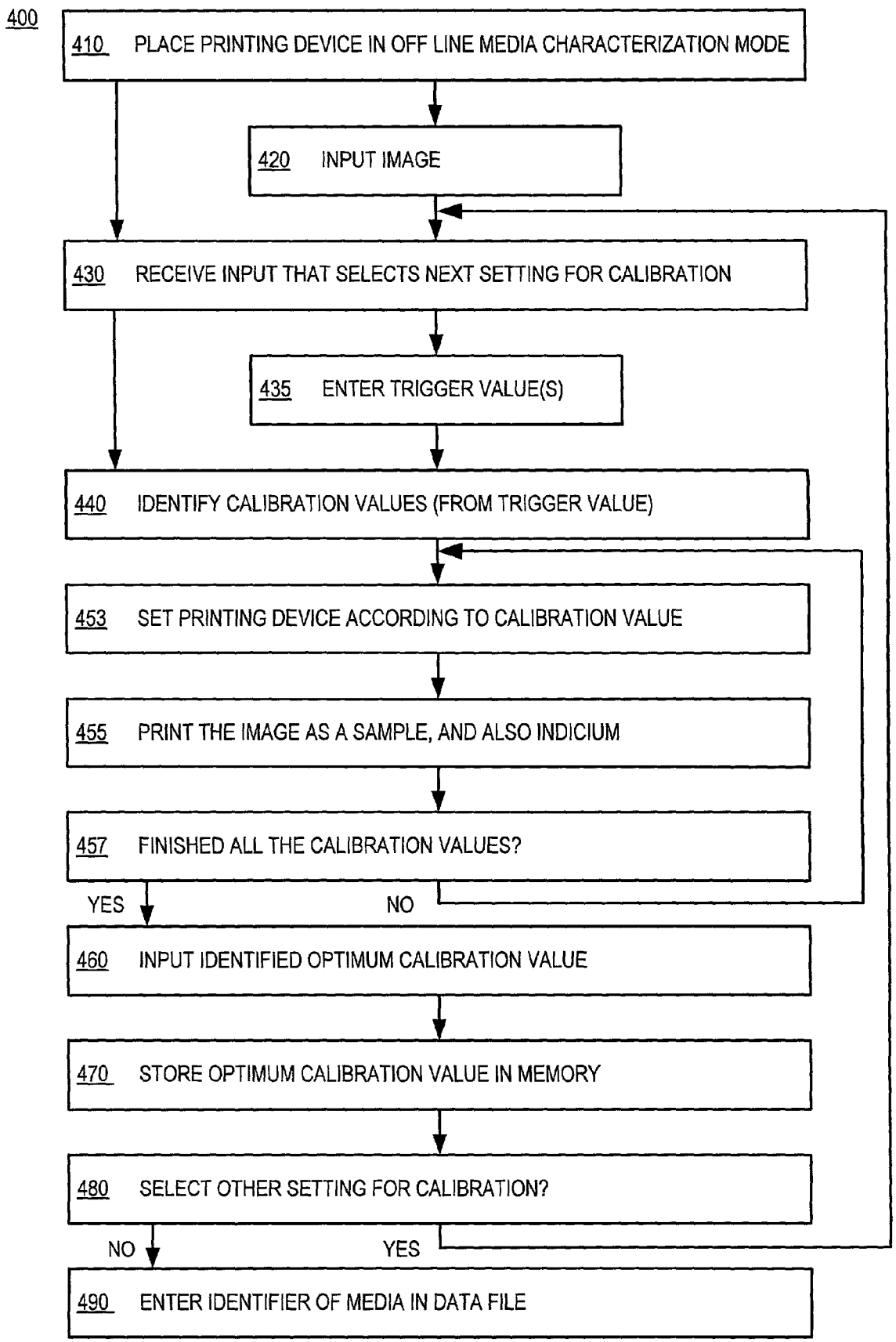
FIG. 4 is a flowchart illustrating a method according to an embodiment of the present invention.

Referring now to FIG. 4, a flowchart 400 is used to illustrate a method according to an embodiment of the invention. The method of flowchart 400 may also be practiced by controller 150 of FIG. 1.

According to a box 410, a printing device is placed in an off line media characterization mode.

According to an optional next box 420, an image is input, which will be used for printing. It is preferred that the same image be used, so that the subsequent comparison will be better.

According to a next box 430, an input is received that selects a next setting for calibration. One of the available settings is thus selected.

According to an optional next box 435, one or more trigger values are entered, preferably through an interface. This step is optional, because suitable calibration values may be stored in a memory.

According to a next box 440, calibration values are identified. If trigger values have been entered, then identifying is by computing from the trigger values.

According to a next box 453, the printing device is set according to one of the identified calibration values, a different one every time this box is executed.

According to a next box 455, the image is printed as a sample, using the setting of box 453 the last time the latter was executed. In addition, an indicium is also printed that corresponds to the calibration value of the setting.

According to a next box 457, it is inquired whether all the calibration values are finished. If not, execution returns to box 453.

If yes, then according to a next box 460, the identified optimum calibration value is input. It may be input by means of one of the printed indicia, as described above.

According to a next box 470, the preferred calibration value is stored in a memory. It may be stored in a data file for the printing medium that is being characterized.

According to a next box 480, it is inquired whether it is desired to select other setting. It is recommended that all available settings be optimized. If yes, then execution returns to box 430.

If not, then according to an optional next box 490, an identifier of the media under characterization is entered. It may be stored in the data file. Alternately, this box may take place at another time.

Then the device may be taken off the media characterization mode, for use to print.

Figure 5:
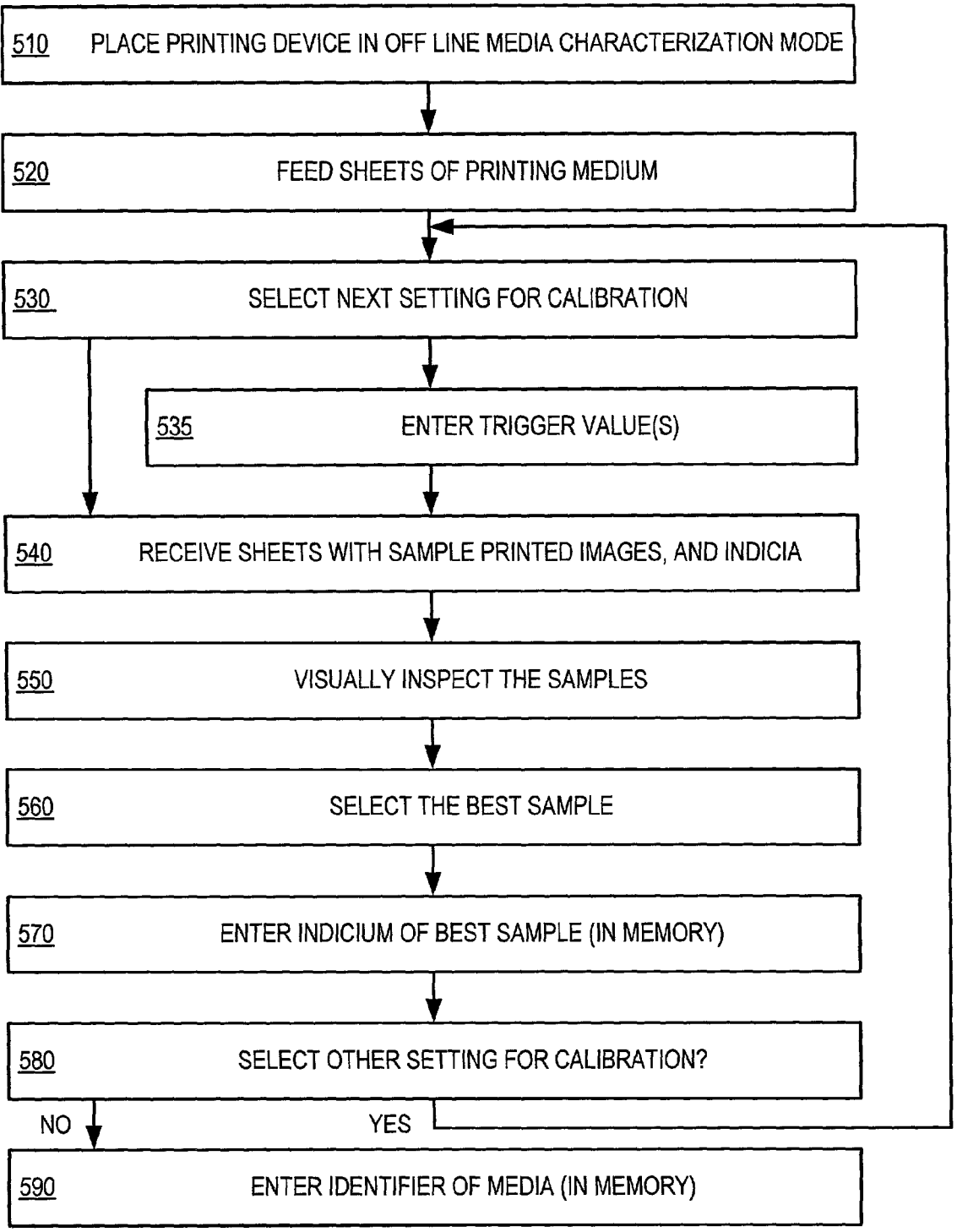
FIG. 5 is a flowchart illustrating a method according to another embodiment of the present invention.

Referring now to FIG. 5, a flowchart 500 is used to illustrate a method according to an embodiment of the invention. The method of flowchart 500 may also be practiced by a user. It will be appreciated that the user need not be a trained technician.

According to a box 510, a printing device is placed in an off line media characterization mode.

According to a next box 520, sheets of the printing medium are fed to the printing device.

According to a next box 530, a next setting is selected for calibration.

According to an optional next box 535, trigger value(s) are entered. Box 535 would be for operating the advanced mode.

According to a next box 540, sheets are received from the printing device. The sheets include sample printed images, and preferably also indicia.

According to a next box 550, the samples are visually inspected.

According to a next box 560, the best sample is selected.

According to a next box 570, the indicium of the best sample is entered, such as in a keyboard (not shown). Preferably it is also entered in a memory.

According to an optional next box 580, it is inquired whether other settings will be selected for calibration. If yes, execution returns to box 530.

If not, then according to an optional next box 590, an identifier of the media is entered, such as in a keyboard (not shown). Preferably it is also entered in a memory.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and sub-combinations of features, functions, elements and/or properties may be presented in this or a related document.

The invention claimed is:

1. A printing system comprising:
   a printing device for printing on a plurality of printing media in accordance with a plurality of adjustable settings;
   a memory to store multiple configurations of the adjustable settings, each configuration of the adjustable settings corresponding to a different printing medium;
   an interface; and
   a controller for controlling the adjustable settings of the printing device responsive to inputs from the interface, the controller having an on line mode wherein the printing device prints while the adjustable settings are unchanging, and an off line mode for characterizing one or more of the printing media by determining one or more of the corresponding configurations of the adjustable settings;
   wherein the controller is adapted to, while in the off line mode,
      identify a plurality of first calibration values for a first setting of the adjustable settings through derivation of at least one trigger value, where the derivation includes incrementing the trigger value by at least a preset or user-defined incremental value,
      iteratively set the first setting of the printing device to each of the first calibration values, where the printing device, after each iteration, prints a corresponding sample image according to the first setting, and
      receive a first feedback input that identifies one of the first calibration values as preferred for the first setting;
   where the controller is adapted to receive a sample value from the interface, where the sample value to identify a number of first calibration values to be derived by the controller; and
   where the sample value identifies a maximum first calibration value, where the controller to cease incrementing the trigger value when one of the derived first calibration values is greater than or equal to the maximum first calibration value.

2. The printing system of claim 1, wherein the controller is further adapted to:
   identify a plurality of second calibration values for a second setting of the adjustable settings after receiving the first feedback input,
   iteratively set the second setting of the printing device to each of the second calibration values, where the printing device, after each iteration, prints a corresponding sample image according to the second setting.
   receive a second feedback input that identifies one of the second calibration values as preferred for the second setting.

3. The printing system of claim 1, wherein the controller is further adapted to
   control the printing device to also print an indicium on each sample corresponding to the calibration value of the first setting being used, and
   interpret the feedback input based on the indicium.

4. The printing system of claim 1, wherein the first setting is a temperature of a fuser.

5. The printing system of claim 1, wherein the first setting is a print speed.

6. The printing system of claim 1, wherein the first setting is a set of color curves.

7. The printing system of claim 1, wherein the first setting is a set of gamma curves.

8. The printing system of claim 1, wherein the first setting is a set of white point data.

9. The printing system of claim 2, wherein the second calibration values are preset for the second setting.

10. The printing system of claim 1, wherein the controller is further adapted to:
    receive at least one trigger value regarding the first setting,
    wherein the first calibration values are derived from the trigger value.

11. The printing system of claim 10, wherein the trigger value corresponds to an initial value.

12. The printing system of claim 11, wherein the first calibration values are derived from an increment and the initial value.

13. The printing system of claim 11, wherein the increment has a preset value.

14. The printing system of claim 1, wherein the controller is further adapted to:
    store in the memory a preferred one of the first calibration values.

15. The printing system of claim 1, wherein the controller is further adapted to:
    store in the memory an identifier for the printing medium that the sample images are printed on.

16. The printing system of claim 15, further comprising: a bar code scanner to read the identifier.

17. The printing system of claim 1 where the controller characterizes printing media having different colors or transparencies.

18. The printing system of claim 1
where the controller receives the trigger value from the interface; and
where the trigger value is one of the first calibration values.

19. The printing system of claim 1 where the trigger value corresponds to a minimum first calibration value and the sample value corresponds to the maximum first calibration value.

20. The printing system of claim 1 where the controller is adapted to receive an increment value from the interface and to derive the first calibration values responsive to the increment value.

21. The printing system of claim 2 where the second calibration values for the second setting of the adjustable settings are preset in the memory.

22. The printing system of claim 2 where the second calibration values for the second setting of the adjustable settings are derived from at least one value stored in the memory or at least one value received from the interface.

* * * * *